May 19, 1931.   L. W. THOMPSON   1,806,317
REGULATING SYSTEM
Filed May 18, 1929
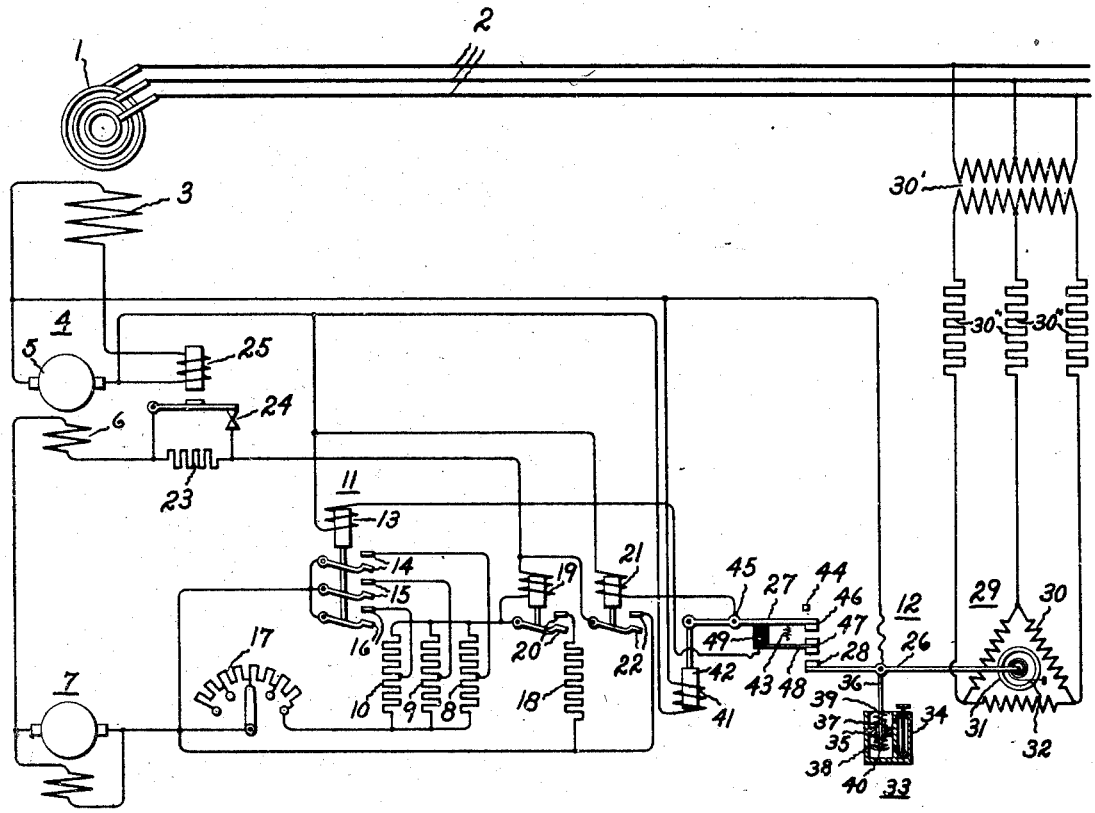
Inventor:
Louis W. Thompson,
by Charles W. Mullan
His Attorney.

Patented May 19, 1931

1,806,317

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

REGULATING SYSTEM

Application filed May 18, 1929. Serial No. 364,183.

My invention relates to electrical regulators and systems of regulation, and more particularly to regulating systems in which the regulation is effected by controlling an electrical characteristic of the excitation circuit of a dynamo-electric machine.

Although not limited thereto my invention is particularly applicable for use in connection with the regulation of the synchronous equipment of power transmission systems. With the extension of power transmission systems by interconnection and the extension of transmission lines to greater distances the problem of maintaining service and increasing stability of operation has received increased attention in recent years. The problem of stability involves a consideration of voltage change with load change and this naturally directs attention to the regulators and systems of regulation of generators and auxiliary units of the system. Incident to regulating systems of this type is the problem of controlling relatively large field currents and quickly varying and controlling the field current under transient conditions occasioned by abnormal load conditions or short circuit in the system.

It is an object of my invention to provide an improved regulating system for increasing the stability limit of power transmission systems.

Another object of my invention is to provide improved means for automatically limiting the duty imposed upon the movable elements of the regulating means directly controlling the regulating current to a safe value when the magnitude of the regulated current is increased above a predetermined value.

A further object of my invention is to provide improved means for quickly increasing the exciting current of a dynamo-electric machine upon the occasion of abnormal load conditions and for limiting the maximum value of said exciting current.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawing in which the single figure is a diagrammatic representation of a regulator system embodying my invention.

Referring to the single figure of the accompanying drawing which is a diagrammatic representation of a power transmission system wherein my invention has been embodied, 1 indicates a synchronous dynamo-electric machine which is connected to a transmission line or distribution circuit 2. The synchronous machine 1 is provided with a field winding 3 which is supplied with an exciting current from a source of direct current shown as a dynamo-electric machine or exciter 4. The exciter 4 comprises an armature 5 which is connected to energize the field winding 3, and a field winding 6 which is preferably excited from a separate source of electrical energy indicated by a self-excited sub-exciter 7. The exciter 4 may be constructed according to known principles of design but it is preferably designed to have a quick rate of response throughout its operating range.

The regulation of relatively large machines is preferably effected by controlling the field current of the main exciter 4 instead of directly controlling the field current traversing field winding 3 in view of the fact that the current values to be controlled are of lower magnitude in the exciter field winding than in the field winding of the main machine. A plurality of parallel connected resistors 8, 9 and 10 are connected in series with the exciter field winding 6 in order to reduce the current that each relay contact is required to handle. While I have shown only three resistors connected in parallel it will be understood that any desired number may be used depending upon the magnitude of the current to be controlled. A portion of each resistor is arranged to be unaffected by the regulator in order to effect substantially equal division of current in the regulated paths. The effective value of a portion of each of the resistors 8, 9 and 10 is controlled by a relay device 11 which forms a part of the regulator 12 to be described hereinafter. The relay 11 may be of any suitable type well known in the art and as shown is provided with an operating winding 13 which is arranged to actuate contacts 14, 15 and 16 connected to control resistors 8, 9 and 10 respectively. The operating winding may be energized from any convenient source and for purposes of illustration is shown connected to be energized from the exciter 4. An adjustable resistor 17 is connected in series relation with the parallel resistors 8, 9 and 10, and the contacts 14, 15 and 16 are arranged to operate across the portions of the parallel resistors to be controlled and the adjustable resistor 17, in order to provide a means for readily adjusting the value of the resistance across which the contacts will operate whereby the maximum limit of the exciter voltage range may be initially fixed at the highest possible value and the minimum limit may be adjusted in accordance with operating conditions without affecting the maximum limit.

In order to limit the duty imposed upon the relay contacts when it becomes necessary to increase the regulated current beyond a predetermined value, I provide means for passing sufficient current around the regulating resistors and contacts so that the current controlled by the contacts shall not exceed a predetermined value. A single resistor 18 is illustrated in the drawing for this purpose but it will occur to those skilled in the art that a plurality of successively actuated resistors may be used depending upon the magnitude of the current to be controlled without departing from my invention in its broader aspects. Resistor 18 is arranged to be connected in parallel with the regulating resistors 8, 9 and 10 in accordance with the excitation requirements of machine 1. Electroresponsive switching means having an operating winding 19 connected to be energized in accordance with the field current of the exciter, as illustrated, or in accordance with the current traversing the field winding in the main machine, is provided for operating switch contacts 20 which are arranged to control the connection and disconnection of resistor 18.

Upon the occasion of short circuits or conditions incident to the application of sudden relatively large increments of load it is desirable to obtain quickly a large increase in the excitation of a synchronous alternating current machine in order to sustain the machine flux or effect an increase in machine flux to reduce thereby the susceptibility to loss of synchronism and thus increase the power limit of the system with which the synchronous machine is associated. For this purpose I provide electroresponsive means comprising an operating winding 21 for controlling switch contacts 22 to short circuit the resistors 8, 9, 10, 17 and 18 in accordance with the change of an electrical characteristic, such as the load, current, voltage, etc., of the synchronous machine. In the illustrated arrangement the energization of winding 21 is controlled in accordance with a decrease in voltage beyond a predetermined value through the action of the contacts of regulator 12. Winding 21 may be energized from any convenient source of electrical energy and, as illustrated, it has been found convenient to energize this winding from exciter 4. A resistor 23 is connected in series with the field winding 6 of the main exciter in order to protect the field winding 6 as well as the field winding 3 when the regulating resistors are short circuited by contacts 22. The resistor 23 is controlled by an electroresponsive device or switch which is shown as comprising contacts 24 and an operating winding 25. Normally contacts 24 are maintained in engagement by any suitable biasing means, and short circuit the resistor 23. The operating winding 25 is connected to be energized in accordance with the current traversing the field winding 3 and as shown is connected in series with the field winding 3. The electroresponsive device is calibrated in such a manner as to separate the contacts 24 and thereby introduce the resistor 23 into circuit with field winding 6 when the current traversing field winding 3 exceeds a predetermined value.

The control of the regulating resistors 8, 9, 10 and 18 may be effected by various types of regulators but for obtaining regulation of synchronous dynamo-electric machines on transmission systems, I find it preferable to use a vibratory type of regulator of the form shown and described in United States Letters Patent No. 1,743,798, granted January 14, 1930, upon an application of Robert H. Park, which discloses an arrangement for effecting proper operation of the regulator when used in connection with a polyphase system irrespectively of whether the electrical characteristic regulated is the same or different in each phase.

Accordingly the regulating resistors are controlled by regulator 12 which in the form shown comprises two main contact arms 26 and 27. Contact arm 26 carries a contact 28 and is actuated by a dynamo-electric device 29 which comprises a stationary polyphase primary or inducing winding 30 for producing a rotating magnetic field and a rotatable closed circuit secondary or induced member 31. The winding 30 is connected to be energized from all of the phases of the machine 1 through suitable transforming means 30′ and resistors 30″. The rotatable member 31 is mechanically connected to actuate arm 26 and forms a pivot for this arm. The torque of the rotatable member 31 under predetermined normal conditions in the regulated circuit is counterbalanced by the torque of a spring 32. The winding 30 is arranged on the inner periphery of a stator core member of the type employed for induction motors in the usual manner of a polyphase distributed winding, and the rotor member 31 is constructed in the form of a hollow shell and preferably of high resistance material such as steel. The motion of contact arm 26 is modified by damping means connected thereto and shown as a dashpot 33. The dashpot 33 is arranged to permit a quick initial movement of lever 26 followed by a damping action and comprises a cylindrical casing 34, a piston 35 therein, and a shaft 36 slidably extending through said piston and resiliently connected thereto by springs 37 and 38 which bear on opposite sides of the piston and which are forced into engagement with the piston by retaining members 39 and 40.

The contact arm 27 is actuated by an electromagnetic means comprising an operating winding 41 and a plunger 42 which is connected to the arm at a point removed from the contact end. The winding 41 is arranged to be energized in accordance with an electrical characteristic of the excitation circuit and as shown is connected to be responsive to the voltage of exciter 4. A spring 43 is connected to the arm 27 near the contact end and is arranged to oppose the pull of the operating winding 41. Suitable means such as the stop 44 is provided in the path of travel of arm 27 to limit the movement thereof. The arm 27 is suitably pivoted at 45 and carries contacts 46 and 47 which are arranged to coöperate with contact 28. Contact 46 is mounted on the arm 27 while contact 47 is suitably mounted, for example on a plate spring 48 which is insulated by a spacing means 49 from arm 27 in a manner to be engaged by contact 28. Contacts 28 and 47 are connected to control the energization of the regulating relay 11 and contacts 28 and 46 are connected to control the energization of the short circuiting means 21. Normally contacts 28 and 47 are arranged to be vibrated into and out of engagement while contacts 28 and 46 are arranged to complete an energizing circuit for coil 21 through the intermediary of contact 47 upon the occurrence of abnormal conditions in the regulated circuit.

The operation of the arrangement shown in the drawing is substantially as follows: First assume that the various dynamo-electric machines are in operation and that the various switching means are in the illustrated positions. It will also be assumed for the moment that contact 28 is in a given fixed position. If the pull of the winding 41 due to the voltage of exciter 4 is insufficient to overcome the pull of spring 43, contact 47 will engage contact 28 and complete the circuit for the operating winding 13 of relay 11 so that contacts 14, 15 and 16 will be closed to short circuit portions of the resistors 8, 9 and 10, respectively, and the resistor 17 in series therewith. As a result the voltage of exciter 4 is increased and consequently the current traversing field winding 3 of machine 1 is also increased. As the voltage of exciter 4 increases to a value sufficient to overcome the pull of spring 43, contacts 47 and 28 will be separated. This inserts resistors 8, 9 and 10 in circuit with field winding 6 and the exciter voltage starts to fall. When it has decreased to a certain value the spring 43 will again close the contacts 47 and 28. Thus for a fixed position of arm 26 and contact 28, the voltage of exciter 4 will vary between two values and a certain average value will be maintained.

The average exciter voltage thus held will cause a certain voltage to exist at the terminals of machine 1. If the voltage of machine 1 is at the predetermined value which is to be maintained constant the torque of rotor 31 is arranged to balance the opposing torque of spring 32, and contact 28 will stay in the assumed position hereinbefore mentioned. If the voltage of circuit 2 departs a predetermined amount from the predetermined normal value contact 28 will be moved in a manner to change the period during which the resistors 8, 9 and 10 are short circuited and thereby increase or decrease the field excitation to increase or decrease the voltage of the machine. If during the process of regulation the current traversing field winding 6 reaches a predetermined value beyond which the contacts 14, 15 and 16 would be subjected to deleterious sparking and arcing and consequent pitting and burning, the winding 19 is calibrated to close its contacts 20 and thereby connect resistor 18 in parallel with the resistors 8, 9 and 10. This resistor passes current around the relay contacts and reduces the burden imposed upon the contacts but still allows the relays to vibrate as formerly.

Now assume circuit 2 is subjected to short circuit conditions either of the single-phase or three-phase type. If the voltage on one or all of the phases decreases more than a predetermined amount contact 28 not only makes contact with contact 47 to short circuit resistors 8, 9, 10 and 18 but carries through and closes contacts 46 and 47. This closure of the regulator contacts completes an energizing circuit for the winding 21 which operates the contacts 22 to complete a short circuit around all the regulating resistors. This action is accomplished quickly due to the yielding connection between the dashpot piston 35 and the lever arm 26, and because of the value of the resistance excluded the voltage of the exciter is increased at a high rate of change and in such a period and to such a maximum value as to maintain the flux in the machine constant or increase it according to the design of the excitation system. Should the current traversing field winding 3 exceed a predetermined value, winding 25 is arranged to separate contacts 24 and introduce resistor 23 into the excitation circuit of exciter 4 to prevent the field winding from being damaged.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. The combination with a dynamo-electric machine having a field winding, of a plurality of parallel resistors connected in series with said field winding, an adjustable resistance connected in series relation with said parallel resistors, and a regulator arranged for controlling simultaneously the effective value of a portion only of each of said parallel resistors and said adjustable resistance.

2. The combination with a dynamo-electric machine having a field winding, of a plurality of parallel resistors connected in series with said field winding, an adjustable resistance connected in series relation with said parallel resistors, and vibratory means for opening and closing simultaneously a circuit around a portion only of each of said resistors and said adjustable resistance.

3. The combination with an electric circuit, of a resistance connected in series therewith, contact means for controlling the effective value of said resistance, and means for by-passing a predetermined current around the portion of said resistor controlled by said contact means when the current in said circuit is above a predetermined value.

4. The combination with a dynamo-electric machine having a field winding, of a resistance connected in series with said field winding, means for controlling said resistance, and means for limiting the current traversing said resistance and controlling means to a predetermined value when the current traversing said field winding is above said predetermined value.

5. The combination with a dynamo-electric machine having a field winding, of a resistance connected in series with said field winding, contact means for periodically excluding and including a portion of said resistance to control the effective value thereof, a normally open circuit including a resistor connected around the portion of said resistance controlled by said contact means, and electroresponsive means for completing said shunt circuit in accordance with an electrical characteristic of said dynamo-electric machine.

6. The combination with a dynamo-electric machine having a field winding of a resistance connected in series with said field winding, vibrating contact means for controlling the effective value of said resistance, a normally open circuit including a resistor connected around the portion of said resistance controlled by said vibrating contact means, and means responsive to the current traversing said field winding for completing said normally open circuit when the current traversing said field winding is above a predetermined value.

7. The combination with a dynamo-electric machine having a field winding, of a plurality of parallel resistors connected in series with said field winding, an adjustable resistance connected in series relation with said parallel resistors, vibratory contacts for opening and closing simultaneously a circuit around a portion only of each of said resistors and said adjustable resistance, a normally open circuit including a resistor connected in parallel relation to said parallel resistors and said adjustable resistance, and means connected to be responsive to the current traversing said field winding above a predetermined value for completing said normally open circuit.

8. The combination with a dynamo-electric machine having an excitation circuit, of a regulating resistance included in said excitation circuit, contact means for controlling the effective value of said resistance to effect regulation within predetermined limits, electroresponsive means for short circuiting said regulating resistance to effect regulation at an accelerated rate beyond said predetermined limits, and means for limiting the maximum value of the current in said excitation circuit when said regulating resistance is short circuited.

9. In combination, a synchronous dynamo-electric machine, an exciting winding therefor, a direct-current dynamo-electric machine provided with a field winding and having an armature winding connected to energize said exciting winding, a separate source of electrical energy connected to energize said field winding, a regulating resistance comprising a plurality of parallel resistors connected in series with said field winding, an adjustable resistance connected in series relation with said parallel resistors, vibratory contacts for opening and closing simultaneously a circuit around a portion only of each of said parallel resistors and said adjustable resistance, a normally open circuit including a resistor connected in parallel relation to said parallel resistors and said adjustable resistance, means connected to be responsive to the current traversing said field winding above a predetermined value for completing said normally open circuit, an additional normally open low resistance circuit in parallel to said regulating resistors and resistances and said first mentioned normally open circuit, and means responsive to a predetermined change of an electrical characteristic of said synchronous machine for completing said second mentioned normally open circuit.

10. In combination, a power transmission circuit, a synchronous polyphase dynamo-electric machine connected thereto, an exciting winding for said synchronous machine, a direct-current dynamo-electric machine provided with a field winding and having an armature winding connected to energize said exciting winding, a separate source of electrical energy connected to energize said field winding, a regulating resistance comprising a plurality of parallel resistors connected in series with said field winding, an adjustable resistance connected in series relation with said parallel resistors, vibratory relays for periodically opening and closing simultaneously a circuit around a portion only of said parallel resistors and said adjustable resistance, a vibratory regulator connected to be operative in accordance with the voltage of each phase of said transmission circuit for controlling said relays, a normally open circuit including a resistor connected around said parallel resistors and said adjustable resistance, means connected to be responsive to the current traversing said field winding above a predetermined value for completing said normally open circuit, a circuit including a normally open switch connected around said regulating resistors and said resistances associated therewith, electromagnetic means arranged to be energized for closing said normally open switch when the voltage of said synchronous machine decreases a predetermined amount from a predetermined normal value, a normally short circuited resistor connected in series with said field winding, and means responsive to the current traversing said exciting winding for opening the short circuit around said resistor.

In witness whereof, I have hereunto set my hand this 17th day of May, 1929.

LOUIS W. THOMPSON.